May 27, 1958

J. G. INGRES 2,836,265

BRAKE OPERATING MECHANISM

Filed Aug. 3, 1953

INVENTOR
JEANNOT G. INGRES

BY John F. Phillips

ATTORNEY

May 27, 1958　　　　J. G. INGRES　　　　2,836,265
BRAKE OPERATING MECHANISM
Filed Aug. 3, 1953　　　　　　　　　　3 Sheets-Sheet 2
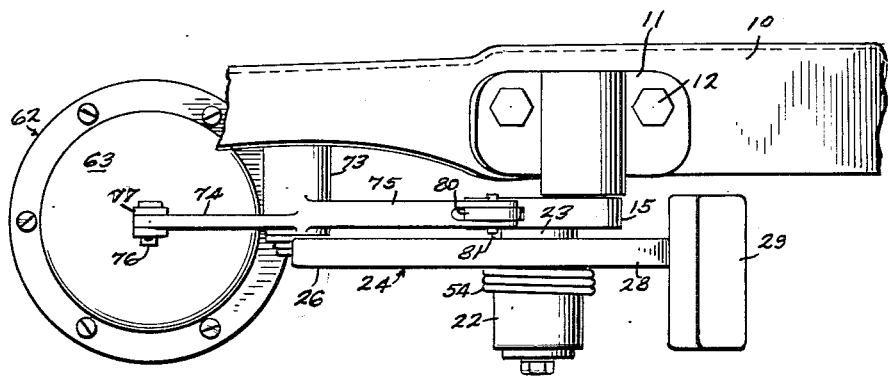
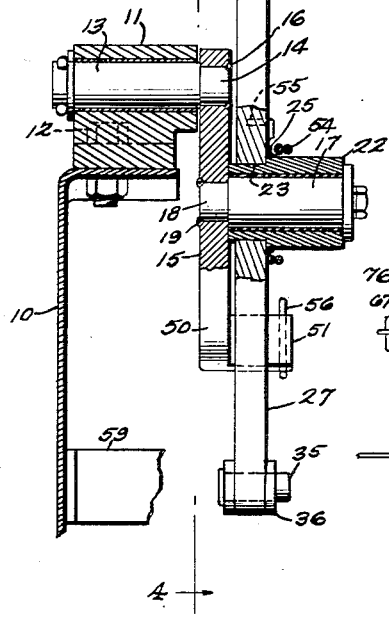
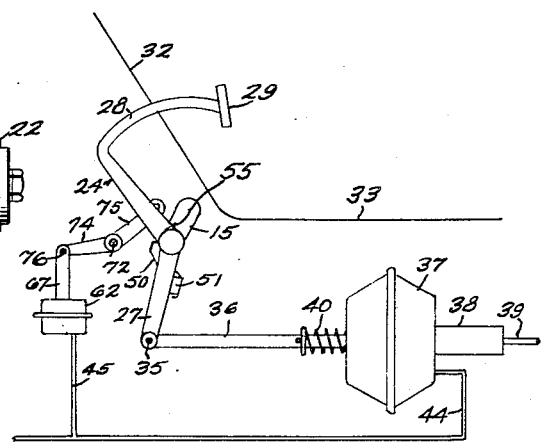
INVENTOR
JEANNOT G. INGRES
BY *John Y. Phillips*
ATTORNEY May 27, 1958 J. G. INGRES 2,836,265
BRAKE OPERATING MECHANISM
Filed Aug. 3, 1953 3 Sheets-Sheet 3

INVENTOR
JEANNOT G. INGRES
BY John F. Phillips
ATTORNEY

United States Patent Office 2,836,265
Patented May 27, 1958

2,836,265

BRAKE OPERATING MECHANISM

Jeannot G. Ingres, Dearborn, Mich., assignor to Kelsey-Hayes Company, a corporation of Delaware Application August 3, 1953, Serial No. 372,109

20 Claims. (Cl. 188—152)

This invention relates to a brake operating mechanism for motor vehicle brakes.

Booster brakes for motor vehicles have come into relatively common use, and such mechanisms include a booster motor energizable by movement of the brake pedal and the braking forces transmitted to the brakes are partly foot-generated forces and partly booster motor forces, the two combining to provide for maximum brake application with a greatly reduced effort on the part of the vehicle operator.

These mechanisms have been brought to a high state of perfection and seldom fail, although there is always the possibility of a failure in the source of power for the booster motor, or in the connections between such source and the booster motor. In the event of such failure, most booster brake mechanisms now in common use provide for the manual braking of the vehicle, but the relatively low leverage provided in the low treadles which are coming into common use for operating booster mechanisms, requires the exertion of very great effort on the part of the operator, with the application of braking forces substantially below maximum.

An important object of the present invention is to provide a brake operating mechanism, particularly for use in operating a brake booster mechanism, wherein a low pedal is provided for operation of the booster mechanism and wherein the pedal automatically moves to a higher position and changes the lever ratio of the brake pedal when no power is available for the booster, thus giving the operator the substantial leverage necessary for manually applying the brakes to stop the vehicle.

A further object is to provide such a mechanism wherein the pedal and associated elements are maintained in a normal operating position by a device operable by power from the same source as that connected to the booster mechanism, and wherein the pedal and associated parts are biased to movement to different positions, to automatically move to such positions upon a failure of the power source of the booster, to provide the operator with a relatively greater leverage for the manual application of the brakes.

A further object is to provide such a mechanism wherein the biasing means which operates automatically upon a failure in the booster power motor includes a lever device for shifting certain elements of the pedal mechanism to manual brake-operating positions and locking the parts in such positions until the source of power for the booster mechanism again becomes operative.

A further object is to provide a mechanism of this character wherein a cam device is operative by the means for biasing the parts to manual brake-operating positions and wherein the cam means is engageable by a roller associated with the biasing means and wherein the roller moves past a given center to positively prevent return movement of the pedal operated parts to normal positions until the power source becomes available for operating the booster motor.

Other objects and advantages of the invention will become apparent during the course of the following description.

In the drawings I have shown one embodiment of the invention. In this showing:

Figure 2 is a plan view of the device and associated motor vehicle parts;

Figure 3 is a section taken substantially on line 3—3 of Figure 1, portions of the brake pedal lever being broken away and parts being shown in elevation;

Figure 5 is a diagrammatic representation of the present construction with relation to its connection with a brake booster mechanism.

Figure 1:
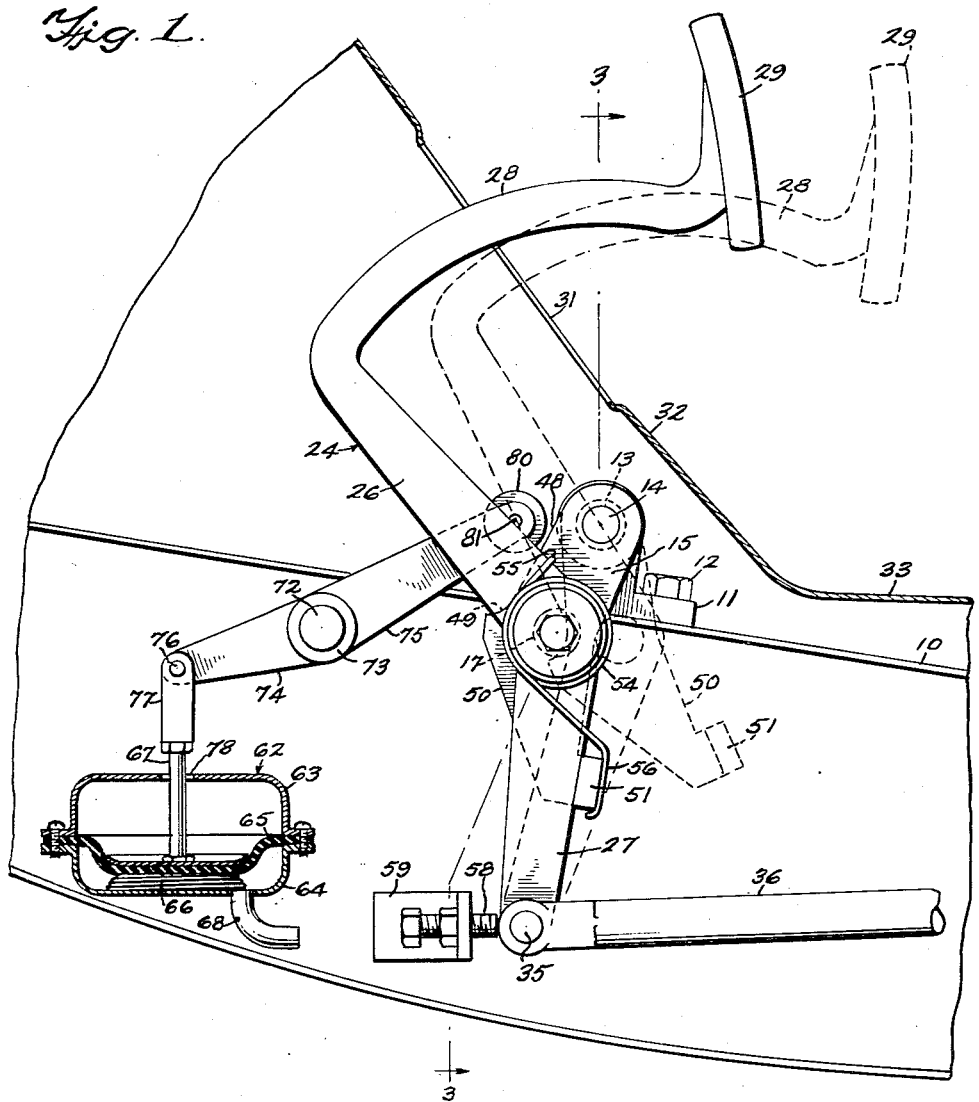
Figure 1 is a side elevation of the operating parts of the pedal mechanism shown in position with respect to certain parts of a motor vehicle, parts being shown in section.

Referring to Figures 1, 2, and 3, the numeral 10 designates a portion of a motor vehicle frame to the top flange of which a bearing 11 is bolted or otherwise secured as at 12. A shaft 13 is mounted in the bearing 11 and has a reduced end 14 mounted in the upper end of a lever arm 15 and preferably welded thereto as at 16. Intermediate its ends, and offset downwardly from the shaft 13, is a second shaft 17 having a reduced end 18 projecting through the lever arm 15 and preferably welded thereto as at 19.

A sleeve 22 is mounted on the shaft 17 for rocking movement thereon and is reduced in diameter as at 23 for insertion through a lever indicated as a whole by the numeral 24, this lever being welded to the sleeve 22 as at 25.

The lever 24 has an upper arm 26 and a lower arm 27, the former of which curves rearwardly as at 28 and is provided at its rear end with a conventional pedal pad 29. The arm 26, accordingly, comprises a pedal lever and the portion 28 of the arm projects through an opening 31 in the vehicle toe board 32, the lower extremity of which merges into the floor board 33.

The lever end 27 is pivotally connected as at 35 (Figures 1 and 5) to a rod 36 extending rearwardly into a booster motor 37. Rearwardly of this motor is arranged the usual master cylinder 38 having a hydraulic line 39 leading therefrom for connection with the vehicle brakes. The rod 36, in accordance with conventional practice, energizes the motor 37 to boost the power generated by the operator's foot in applying the brakes, and the parts within the motor 37 are biased to the normal off positions. For the purpose of illustration, a spring 40 is shown in Figure 5 as the means for biasing the operating rod 36 to the normal off position shown in such figure.

The booster motor is shown as being of the vacuum operated type and to one side of the motor is connected a vacuum line 44 leading to the intake manifold of the engine or any other source of vacuum. The line 44 is provided with a branch line 45 for a purpose to be described.

Figure 4:
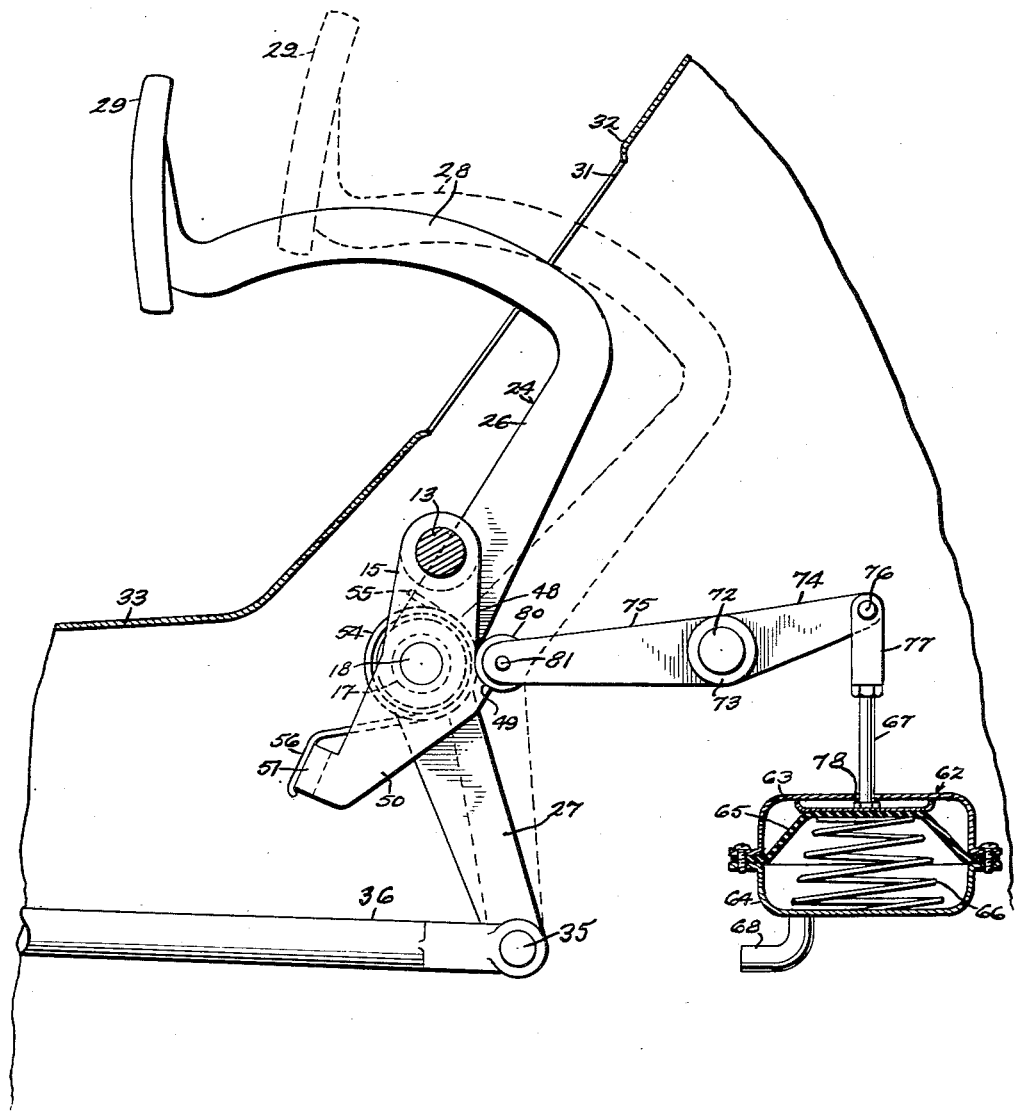
Figure 4 is a section on line 4—4 of Figure 3, with the parts shown in solid lines with the brake pedal in manually operable position.

The lever arm 15 has its forward edge forming a cam surface 48, as clearly shown in Figure 4, and the lower extremity of this surface terminates in an arcuate seat 49 for a purpose to be described. The lever arm 15 is provided below the axis of the shaft 17 with a downwardly and rearwardly inclined arm 50 arranged parallel to the lever arm 27 as shown in Figure 3. The lower extremity of the arm 50 is provided with a laterally extending lug 51 normally lying against the forward edge of the lever arm 27, as shown in Figure 1. A torsion spring 54 surrounds the sleeve 22. One end 55 of this spring extends transversely of the lever arm 26 for engagement with the rear edge thereof, while the lower end 56 of the spring 54 engages against the rear face of the lug 51. This spring exerts forces at its ends tending to turn the lever 24 counterclockwise and the lever 15 clockwise, thus biasing the lug 51 into engagement with the rear edge of the lever arm 27.

From the foregoing, it will be apparent that in the normal manual operation of the brake lever 24, this lever and the lever 15 turn as a unit upon depression of the pedal 29 to move the rod 36 rearwardly. This rod is biased forwardly by the usual biasing means of the booster motor, shown in this instance as the spring 40 (Figure 5). Forward movement of the rod 36 is limited by a stop screw 58 carried by a bracket 59 which may be welded to the frame 10.

Referring to Figures 1 and 4, the numeral 62 designates a small vacuum motor as a whole comprising upper and lower casing sections 63 and 64 between which is clamped a flexible diaphragm 65 urged upwardly by a spring 66 and provided with a vertically extending stem 67. The lower casing section 64 is provided with an angle nipple 68 to which the branch vacuum line 45 is connected. Accordingly, it will be apparent that so long as vacuum is available for the booster motor, differential pressures in the diaphragm motor 62 will hold the diaphragm 65 downwardly. A stub shaft 72 is suitably connected to the web of the frame 10, for example by welding (not shown) and supports a sleeve 73 having forward and rear lever arms 74 and 75 projecting therefrom.

The lever arm 74 is pivotally connected as at 76 to a yoke 77 connected to and projecting upwardly from the stem 67. The stem 67 projects through an enlarged opening 78 in the top of the casing section 63. This opening accommodates the horizontal components of movement incident to movement of the pivot pin 76 about the axis of the stub shaft 72 and freely connects the interior of the casing section to the atmosphere.

The lever arm 75 projects rearwardly and upwardly and is provided at its upper end with a roller 80 arranged in the plane of the lever 15, as shown in Figure 2, and supported by a pivot pin 81. This roller, in the off positions of the parts as shown in solid lines in Figure 1, is slightly spaced from the cam edge 48. Upon downward rocking movement of the lever arm 75 as described below, the roller 80 will engage the cam surface 48, swing the lever 15 rearwardly to the solid line position shown in Figure 4, and come to rest against the shoulder 49. At such point, the axis of the pin 81 will lie slightly below a plane passing through the axes of the shafts 17 and 72.

*Operation*

Assuming that the motor vehicle engine is operating, thus providing a source of partial vacuum through the lines 44 and 45, or assuming that some other source of partial vacuum is in operation, the parts of the apparatus will occupy the normal off brake positions shown in solid lines in Figure 1 and in Figure 5. Atmospheric pressure in the diaphragm motor casing section 63 will hold the diaphragm 65 downwardly against the compression of the spring 66, and the roller 80 will remain stationary in the position shown in solid lines in Figure 1 and will be inoperative.

The operator may apply the brakes by depressing the pedal pad 29 in the usual manner. The present device is particularly intended for use with a booster motor wherein the booster performs a substantial part of the work and, accordingly, it is practical to use a "low pedal" as suggested by the solid line position of the pedal pad 29 in Figure 1. This greatly facilitates transferring the foot from the accelerator treadle to the pedal pad 29, and this pad may be pushed forwardly and downwardly to apply the brakes. This action rocks the lever 24 as a whole in a counterclockwise direction, and the rear edge of the lever arm 27, engaging the lug 51, will rock the lever 15 about the axis of the shaft 13. In other words, the levers 15 and 24 will be relatively immovable and rock as a unit about the axis of the shaft 13.

In this operation it will be apparent that the upper effective pedal lever arm will be represented by the distance from the axis of the shaft 13 to the contact point of the foot on the pedal pad 29, while the lower pedal arm will be represented by the distance between the axis of the shaft 13 and the axis of the pivot pin 35. This provides relatively short brake pedal leverage and preferably is the conventional leverage employed with a booster brake mechanism. The operation referred to moves the rod 36 rearwardly to operate the valves of the booster motor 37, whereupon this motor comes into operation to assist the operator in displacing fluid from the master cylinder 38 into the brake line 39. In releasing the brakes, the levers 15 and 24 will again rock as a unit about the axis of the shaft 13 until they reach the normal off positions shown in solid lines in Figure 1.

Assuming that the source of power fails, for example, if the line 44 is broken or if the vehicle is moving with a dead motor, there will be no vacuum present for operating the booster motor, and since it necessarily follows that there will be no vacuum in the casing section 64 of the diaphragm motor, the spring 66 will push the diaphragm 65 to the upper position shown in Figure 4. In so operating, the vacuum motor will rock the lever arms 74 and 75 in a clockwise direction as seen in Figure 1. The roller 80 engages the cam surface 48 of the lever 15, and as the roller moves downwardly over such cam surface, it will swing the lever 15 to the broken line position in Figure 1 and the solid line position in Figure 4. Referring to the latter figure, it will be noted that the roller 80 will come to rest against the shoulder 49, at which point the axis of the shaft 81 of the roller 80 will lie below a plane passing through the axes of the shafts 17 and 72. This movement of the lever 15 is effected against the tension of the torsion spring 54, and the lug 51 will be moved to the broken line position shown in Figure 1, substantially out of engagement with the lever arm 27. The axis of the roller 80 being below the plane referred to, no biasing means can be effective for moving the lever 15, and this lever will remain stationary while the biasing spring 40 of the booster motor will maintain the forward end of the rod 36 against the stop screw 58.

Thus, with the brake operating parts, including the rod 36, their normal off positions, the axis of the shaft 17 will be moved rearwardly, and the pedal arms 26 and 28 and pedal pad 29 will be moved to the broken line positions shown in Figure 1 and the solid line positions in Figure 4. The shaft 17 now becomes a stationary pivot support for the brake lever 24. The upper pedal arm will now be represented by the distance between the axis of the shaft 17 and the point of contact of the foot on the pedal pad 29, while the lower lever arm will be represented by the distance between the axis of the shaft 17 and the axis of the pivot pin 35. Thus, with the rod 36 and the elements operated thereby in the normal off brake positions, the pedal pad 29 will be moved substantially rearwardly. Moreover, the upper pedal lever arm will be substantially lengthened and the lower arm substantially shortened, thus providing the operator with increased leverage for the application of the vehicle brakes in the same manner as is now accomplished without the use of a booster motor.

In this connection attention is invited to the fact that most booster motors now in actual use are manually operable in the event of a failure in power in the motor, and such a construction is now so common in the industry that specific illustration is unnecessary. The amount of change in the leverage ratios between manual and power operation of the brakes, of course, is a matter of design. In the specific illustration shown, the normal pedal pad travel from the solid line position in Figure 1 is approximately 3″ while the pedal pad travel from the broken line position in Figure 1, upon a failure in power, is approximately 5½″. Accordingly, the pedal travel in the foot application of the brakes is nearly twice as great as in power operation of the brakes, and the lever ratio is approximately proportionally increased. This lever ratio, as stated, is a matter of design. For example, the axes of the shafts 14 and 17, if arranged a greater distance apart, will increase the ratio for foot operation, and if the distance between the axes of these shafts is reduced, the leverage ratio increase will be reduced. The pedal lever ratios will be a matter of choice or preference on the part of motor vehicle manufacturers.

From the foregoing it will be apparent that the present construction provides a brake operating means which permits the use of a conventional booster brake mechanism with a low pedal. At the same time, it eliminates the necessity for the exertion of great force on the part of the operator, in the event no power is available for operating the booster motor, the change-over in lever ratios upon a failure in power being fully automatic. It also will be apparent that when operativeness of the source of booster motor power is restored, the motor 62, which may be of any type responsive to such power, will result in restoring the parts to their normal positions. Under such conditions, the lever arms 74 and 75 will be rocked counterclockwise to disengage the roller 80 from the cam surface 48, whereby the force of the torsion spring 54 will restore the levers 15 and 24 to their normal relative positions shown in solid lines in Figure 1.

I claim:

1. A brake operating mechanism comprising a lever structure having a pedal arm and a brake operating arm, means providing a normal pivot axis for said lever structure, power means having mechanical engagement with said first named means for changing said pivot axis to increase the effective length of said pedal arm, and means controlling energization of said power means.

2. A brake operating mechanism comprising a lever structure having a first lever member and a second lever member the former of which is pivoted to said second lever member for turning movement on a predetermined axis intermediate the ends of said first lever member, one end of said first lever member constituting a pedal arm and the other end constituting a brake operating arm, means independent of said first lever pivotally supporting said second lever member for rocking movement on an axis parallel to said first axis and between such axis and the end of said pedal arm, means normally connecting said lever members for rocking movement as a unit about said second axis, and means for swinging said second lever member about its pivot axis and disconnecting it from said first lever member whereby the latter is free to turn on said first pivot axis independently of said second lever member.

3. A brake operating mechanism comprising a lever structure having a first lever member and a second lever member the former of which is pivoted to said second lever member for turning movement on a predetermined axis intermediate the ends of said first lever member, one end of said first lever member constituting a pedal arm and the other end constituting a brake operating arm, means pivotally supporting said second lever member for rocking movement on an axis parallel to said first axis and between such axis and the end of said pedal arm, means normally connecting said lever members for rocking movement as a unit about said second axis, biasing means tending to turn said second lever member about its pivot axis and to disconnect it from said first lever member whereby the latter is free to turn on said first-named pivot axis independently of said second lever member, and means normally overcoming said biasing means.

4. A brake operating mechanism comprising a first lever member having an upper end provided with a pedal pad, a brake operating member connected to the lower end of said first lever member, a second lever member, a first pivot means carried by said second lever member and pivotally supporting said first lever member intermediate its ends, a second pivot means for supporting said second lever member for turning movement on an axis above the axis of said first pivot means, means biasing said lever members for relative turning movement with respect to each other, said lever members having interengaging portions limiting said relative turning movement to establish normal positions of said lever members relative to each other, whereupon, upon rocking movement of said first lever member, said lever members will turn as a unit on the axis of said second pivot means to impart movement to said brake operating member, and means for swinging said second lever member to move the first pivot means and to disengage said lever members from each other whereby said first lever member is free to turn on the axis of the first pivot means independently of said second lever member.

5. A brake operating mechanism comprising a pedal lever having upper and lower ends the former of which is provided with a pedal pad, a supporting lever mounted for turning movement on a fixed axis, means connecting said pedal lever for pivotal movement on said supporting lever about a second axis below said fixed axis, said levers having portions interengaging, whereby operation of said pedal lever through said pedal pad will effect movement of said supporting lever to turn said levers as a unit about said fixed axis, means biasing said levers for relative turning movement to maintain the interengagement between said levers, a brake operating member connected to said lower end of said pedal lever, means limiting movement of said brake operating member to a normal off position from which position it is movable upon operation of said pedal lever, and means for turning said supporting lever about said fixed axis against said biasing means to disengage the interengaging portions of said levers and to move said second axis, whereupon said pedal lever is free to rock on said second axis independently of said supporting lever.

6. A brake operating mechanism in accordance with claim 5 wherein said last named means comprises a biasing spring, and power means normally overcoming said spring to render said last named means inoperative.

7. A brake operating mechanism comprising a supporting lever having an upper and lower end, pivot means supporting said lever for turning movement on a first axis adjacent its upper end, a second pivot means carried by said supporting lever at a point spaced below said first axis, a pedal lever mounted intermediate its ends on said second pivot means for turning movement on a second axis, said pedal lever having an upper end provided with a pedal pad and having a lower end below said second axis, a brake operating member connected to such lower end, said lower lever end being movable rearwardly upon forward movement of said pedal pad, a stop member carried by said supporting lever and engaging said lower lever arm rearwardly thereof, and below said second axis, means biasing said levers for relative turning movement to maintain said stop member in engagement with said lower lever arm, means limiting forward movement of said lower lever arm to an off position, spring means for urging said lower lever arm to said normal off position, and means for swinging the lower end of said supporting lever rearwardly to effect relative turning movement of said levers about said second axis against said biasing means and to move said second axis rearwardly and to move said stop member out of engagement with said pedal lever whereby the latter is free to turn about said second axis independently of said supporting lever.

8. A mechanism constructed in accordance with claim 7 wherein the means for turning said levers against said biasing means comprises a device engageable with said supporting lever to effect such turning movement, a biasing spring urging said device to effect such turning of said levers, and means normally overcoming such biasing spring to maintain said device inoperative.

9. In combination with a brake booster mechanism having an operating rod, means for biasing said rod to a normal off position, power transmission means for connecting said booster mechanism to a source of power, a lever structure having a pedal arm and a brake operating arm connected to said rod, means providing a normal pivot axis for said lever structure intermediate the ends thereof, and means subject to a failure of power in said power transmission means for changing said pivot axis to increase the effective length of said pedal arm.

10. In combination with a brake booster mechanism having an operating rod, means for biasing said rod to a normal off position, means for connecting said booster mechanism to a source of power, a lever structure having a first lever member and a second lever member the former of which is pivoted to said second lever member for turning movement on a predetermined axis intermediate the ends of said first lever member, one end of said first lever member constituting a pedal arm and the other end constituting a brake operating arm pivotally connected to said rod, means pivotally supporting said second lever member for rocking movement on an axis parallel to said first-named axis and between such axis and the end of said pedal arm, means normally connecting said lever members for rocking movement as a unit about said second-named axis, and means for swinging said second lever about said second-named axis and disconnecting it from said first-named lever whereby the latter is free to turn on said first-named axis independently of said second lever member, said last-named means being operative by a failure of power in said source.

11. In combination with a brake booster mechanism having an operating rod, means for biasing said rod to a normal off position, and means for connecting said booster mechanism to a source of power, a lever structure having a first lever member and a second lever member the former of which is pivoted to said second lever member for turning movement on a predetermined axis intermediate the ends of said first lever member, one end of said first lever member constituting a pedal arm and the other end constituting a brake operating arm pivotally connected to said rod, means pivotally supporting said second lever member for rocking movement on an axis parallel to said first-named axis and between such axis and the end of said pedal arm, means normally connecting said lever members for rocking movement as a unit about said second-named axis, biasing means tending to turn said second lever about said second-named pivot axis and to disconnect it from said first lever member whereby the latter is free to turn on said first-named pivot axis independently of said second lever means, and means operative by power in said source for normally overcoming said biasing means.

12. A combination with a differential fluid pressure operated booster brake mechanism having a conduit for connecting it with a source of pressure differential, an operating rod, means for biasing said rod to a normal off position, and means for limiting movement of said rod to such position, the first lever member having an upper end provided with a pedal pad, a second lever member, a first pivot means carried by said second lever member and pivotally supporting said first lever member intermediate its ends, a second pivot means for supporting said second lever member for turning movement on an axis above the axis of said first pivot means, means biasing said lever members for relative turning movement with respect to each other, said lever members having interengaging portions limiting said relative turning movement to establish normal positions of said lever members relative to each other, whereby, upon rocking movement of said first-named lever member, both lever members will turn as a unit on said second pivot means to impart movement to said rod, and means operative upon a failure of power in said conduit for swinging said second lever member to move said first pivot means and disengage said lever members from each other whereby said first lever member is free to turn on said first pivot means independently of said second lever member.

13. The combination defined in claim 12 wherein said last-named means comprises a biasing spring for urging said second lever member to move said first pivot means, and means operative when a pressure differential is present in said conduit for overcoming said biasing spring.

14. A combination as defined in claim 12 wherein said last-named means comprises a biasing spring constantly tending to swing said second lever member to disengage said lever members from each other, and an auxiliary differential fluid pressure motor connected to said conduit for overcoming said biasing spring when differential pressure is present in said conduit.

15. A combination with a differential fluid pressure operated booster brake mechanism having a conduit for connecting it with a source of pressure differential, an operating rod, means for biasing said rod to a normal off position, and means for limiting movement of said rod to such position, a supporting lever having an upper end, pivot means supporting said lever for turning movement on a fixed axis adjacent its upper end, a second pivot means carried by said supporting lever at a point spaced below said fixed axis, a pedal lever pivotally supported intermediate its ends on said second pivot means, said pedal lever having an upper end provided with a pedal pad and having a lower end pivotally connected to said rod, a stop member carried by said supporting lever and engaging said lower pedal lever end rearwardly thereof below the axis of said second pivot means, means baising said stop member into engagement with said lower lever end, and means operative upon a failure of power in said conduit for swinging the lower end of said supporting lever rearwardly to effect relative turning movement of said levers about the axis of said second pivot means and against said biasing means and to move said second pivot means rearwardly whereby said pedal lever is free to turn about said second pivot means independently of said supporting lever.

16. The combination defined in claim 15 wherein said last-named means comprises a second biasing means stronger than said first-named biasing means and operative for swinging the lower end of said supporting lever rearwardly, and a power device operative by differential pressure in said conduit for overcoming said second biasing means.

17. A brake operating mechanism comprising a supporting lever having an upper end, pivot means supporting said lever for turning movement on a first axis adjacent its upper end, a second pivot means carried by said supporting lever at a point spaced below said first axis, a pedal lever mounted intermediate its ends on said second pivot means for turning movement on a second axis, said pedal lever having an upper end provided with a pedal pad and having a lower end below said second axis, a brake operating member connected to such lower end, said lower lever end being movable rearwardly upon forward movement of said pedal pad, a stop member carried by said supporting lever and engaging said lower lever end rearwardly thereof, and below said second axis, means biasing said levers for relative turning movement to maintain said stop member in engagement with said lower lever end, means limiting forward movement of said lower lever end to an off position, spring means for urging said lower lever end to said normal off position, the forward edge of said supporting lever constituting a cam surface terminating at its lower extremity in a stop shoulder, a control lever having an end movable between an upper inoperative position disengaged from said supporting lever and a lower position engaging said stop shoulder and operative upon movement to said lower position for swinging said supporting lever rearwardly to move said second pivot means rearwardly and move said stop member out of engagement with said pedal lever whereby the latter is free to turn about said second pivot means independently of said supporting lever, spring means urging said end of said control lever to its lower position, and power means normally operable for maintaining said end of said control lever in its upper position.

18. A mechanism according to claim 17 provided with a third pivot means supporting said control lever, the point of engagement of said control lever with said supporting lever, when said supporting lever is in engagement with said stop shoulder, being below a plane passing through the axes of said second and third pivot means.

19. An operating mechanism for a brake operating rod comprising a first lever having a pedal pad and a connection with the brake operating rod, a pivot pin supporting said first lever at a point spaced from said pedal pad and from said connection, a second lever carrying said pivot pin, means spaced from said pivot pin for supporting said second lever for turning movement on a fixed axis, rigid means engaging between said levers and tending to prevent relative turning movement therebetween from normal positions relative to each other whereby operation of said first lever by a force applied to said pedal pad will turn said levers as a unit, a control lever normally disengaged from said second lever and engageable with said second lever to turn it about said fixed axis to change the position of said pivot pin and release said levers from each other whereby said first lever turns about said pivot pin, and means for operating said control lever to move it into engagement with said second lever.

20. An operating mechanism for a brake operating rod comprising a first lever having a pedal pad and a connection with the brake operating rod, a pivot pin supporting said first lever at a point spaced from said pedal pad and from said connection, a second lever carrying said pivot pin, means spaced from said pivot pin for supporting said second lever for turning movement on a fixed axis, rigid means engaging between said levers and tending to prevent relative turning movement therebetween from normal positions relative to each other whereby operation of said first lever by a force applied to said pedal pad will turn said levers as a unit, said means comprising an element for limiting turning movement of said second lever in one direction to its normal position relative to said first lever, and a spring biasing said second lever to such position, a control lever pivoted for turning movement on a fixed axis and having a roller at one end normally out of engagement with said second lever and engageable with said second lever upon turning movement of said control lever to change the position of said pivot pin and release said levers from each other whereby said first lever turns about said pivot pin, and means for applying a force to said control lever for turning it to engage said roller with said second lever to turn the latter about said last-named fixed axis.

References Cited in the file of this patent

UNITED STATES PATENTS

| 1,582,118 | Bragg et al. | Apr. 27, 1926 |
| 1,601,649 | Schaeffer | Sept. 28, 1926 |
| 1,754,387 | Hall | Apr. 15, 1930 |
| 1,954,520 | Bragg et al. | Apr. 10, 1934 |
| 2,037,869 | Wall | Apr. 21, 1936 |
| 2,265,546 | Price | Dec. 9, 1941 |
| 2,365,960 | Ingres | Dec. 26, 1944 |
| 2,596,040 | Nutt | May 6, 1952 |

FOREIGN PATENTS

| 336,696 | Great Britain | Oct. 23, 1930 |